(12) United States Patent
Tsourides

(10) Patent No.: US 6,659,131 B2
(45) Date of Patent: Dec. 9, 2003

(54) SYSTEM AND METHOD FOR INTEGRATING GAS COMPONENTS

(75) Inventor: Christ A. Tsourides, McKinney, TX (US)

(73) Assignee: Mykrolis Corporation, Bedford, MA (US)

( * ) Notice: Subject to any disclaimer, the term of this patent is extended or adjusted under 35 U.S.C. 154(b) by 31 days.

(21) Appl. No.: 10/010,372

(22) Filed: Nov. 5, 2001

(65) Prior Publication Data

US 2002/0038673 A1 Apr. 4, 2002

Related U.S. Application Data

(63) Continuation of application No. 09/961,595, filed on Sep. 24, 2001, which is a continuation of application No. 09/261,251, filed on Mar. 3, 1999, now abandoned.
(60) Provisional application No. 60/109,166, filed on Nov. 20, 1998.

(51) Int. Cl.[7] .............................................. F16K 11/10
(52) U.S. Cl. ....................................... 137/884; 137/269
(58) Field of Search ................................. 137/884, 269

(56) References Cited

U.S. PATENT DOCUMENTS

| | | |
|---|---|---|
| 3,516,436 A | 6/1970 | Klaus et al. |
| 3,589,387 A | 6/1971 | Raymond |
| 3,654,960 A | 4/1972 | Kiernan |
| 5,163,475 A | 11/1992 | Gregoire |
| 5,303,731 A | 4/1994 | Vavra et al. |
| 5,333,637 A | 8/1994 | Gravel |
| 5,605,179 A | 2/1997 | Strong, Jr. et al. |
| 5,684,245 A * | 11/1997 | Hinkle ............................... 1/1 |
| 5,730,181 A | 3/1998 | Doyle et al. |
| 5,769,110 A * | 6/1998 | Ohmi et al. ................. 137/269 |
| 5,819,782 A | 10/1998 | Itafuji |
| 5,964,481 A | 10/1999 | Buch |
| 5,992,463 A | 11/1999 | Redemann et al. |
| 6,012,479 A | 1/2000 | Fukushima et al. |
| 6,123,340 A * | 9/2000 | Sprafka et al. .............. 277/608 |
| 6,149,718 A * | 11/2000 | Cowan et al. ................. 96/147 |

FOREIGN PATENT DOCUMENTS

| | | |
|---|---|---|
| EP | 0791670 A2 | 8/1997 |
| WO | WO 96/34705 A1 | 11/1996 |

* cited by examiner

Primary Examiner—John Fox
(74) Attorney, Agent, or Firm—Gray Cary Ware & Freidenrich, LLP

(57) ABSTRACT

A system and method for integrating gas components that combines together, either in an in-line or modular fashion, at least two gas components used in a gas stick for flowing a gas from a first point to an end point. In one embodiment, the present invention can be used to combine a pressure transducer, a filter, and a display into a single unit that will reduce the gas stick size along the gas flow axis of the gas stick. The gas components can be integrated using VCR connections for an in-line use of the present invention. In the modular form, the present invention can use a number of different connections to connect the gas components vertically on a modular base block (i.e., stacked approximately perpendicular to the modular base block). Thus, the gas components will stack vertically with respect to the traditional horizontal gas flow path axis.

3 Claims, 4 Drawing Sheets

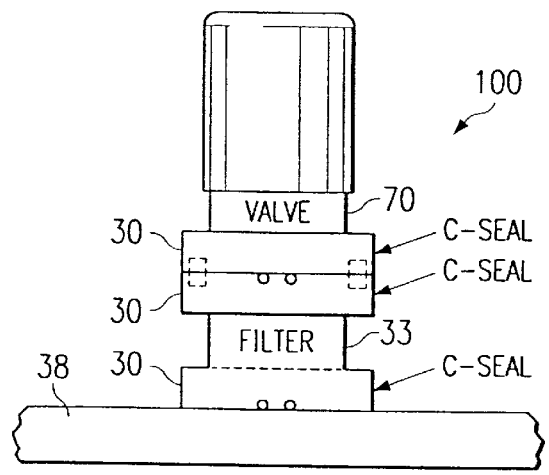
FIG. 4
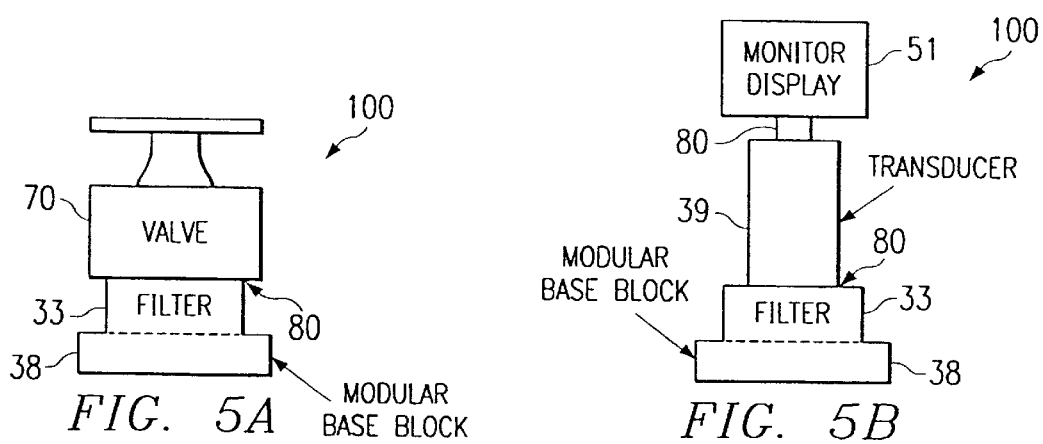
FIG. 5A
FIG. 5B
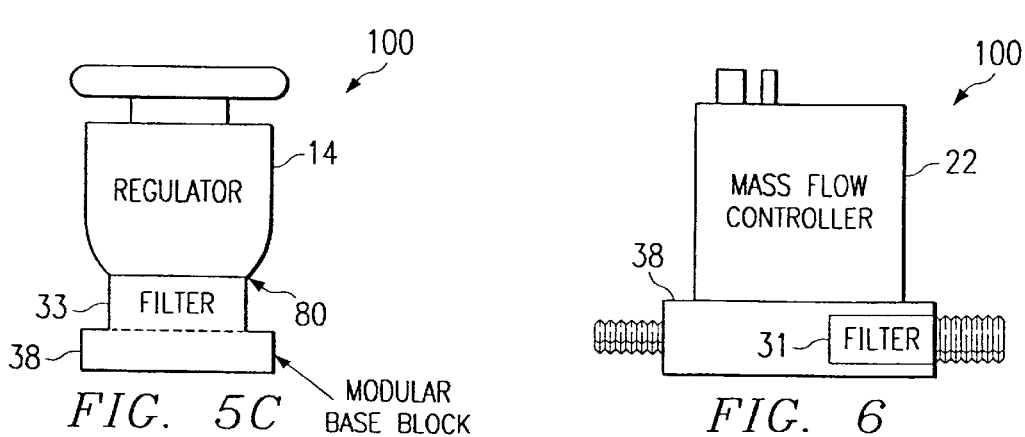
FIG. 5C
FIG. 6

SYSTEM AND METHOD FOR INTEGRATING GAS COMPONENTS

RELATED APPLICATIONS

This Application is a continuation of U.S. patent application Ser. No. 09/961,595, filed Sep. 24, 2001, which is a continuation of U.S. patent application Ser. No. 09/261,251, filed Mar. 3, 1999, now abandoned, which claims the benefit of U.S. Provisional Patent Application No. 60/109,166, filed Nov. 20, 1998.

TECHNICAL FIELD OF THE INVENTION

The present invention relates generally to gas transport systems and measuring devices, and more particularly, a system and method for integrating various components in a gas transport system, and even more particularly to the integration of gas flow components in a gas stick for use in semiconductor manufacturing.

BACKGROUND OF THE INVENTION

Many of today's manufacturing processes require the delivery of gases through a gas flow path having a number of components used to regulate, filter, purify and monitor the gas flowing through the path. For example, current semiconductor manufacturing processes, such as chemical vapor deposition, require the delivery of ultra-pure gases at proper flow rates and amounts to tools within a process chamber. A number of gas components are typically incorporated into the gas path, commonly referred to in semiconductor manufacturing processes as the gas stick, including mass flow controllers, flow monitors, moisture monitors, valves, regulators, gas filters, gas purifiers, pressure sensors, diffusers, capacitance diaphragm gauges, displays, pressure transducers, and other commercially available components. An exemplary gas path 10, or gas stick, is shown in FIG. 1. In FIG. 1, the gas will flow from a source through gas path 10 that can include, as an example, an isolation valve 12, a regulator 14, a pressure transducer or sensor 16, a filter 18, an isolation valve 20, a mass flow controller 22, and a downstream isolation air operated valve 26 to the process chamber (not shown). Each individual gas component is connected to the next using a series of in-line connectors 24. Each of the gas components in FIG. 1 performs a single function and each is connected in-line along the horizontal gas flow path 28. This is an exemplary manufacturing system and any number of additional and alternative components could comprise the gas path from the source to the process chamber.

The commercial gas path components described above have traditionally been manufactured as separate stand-alone units that are connected together, typically in-line. In the example of FIG. 1, stand alone filter 18 is placed in the gas stick 10 prior to the mass flow controller 22 in order to protect the mass flow controller 22 in corrosive gas applications. Likewise, any of the gas components described above might be included in the gas stick 10 as a stand alone item for a particular application. However, adding gas components to an in-line gas stick 10 increases the overall length of the gas stick 10 by both the component length and the connector length.

The semiconductor industry is also moving to a modular gas stick that uses a standard footprint. However, the standard footprint has space limitations that might limit the number of gas components that can reside on the gas stick. Furthermore, it is difficult or impossible to simply stack gas components vertically, one on top of another, onto a modular footprint using conventional in-line connections.

SUMMARY OF THE INVENTION

The present invention provides an improved gas component integration system and method that substantially eliminates or reduces disadvantages and problems associated with previously developed gas flow path systems and methods used for flowing a gas from a source, through a number of components, to a destination.

More specifically, the system and method for integrating gas components of the present invention provides an integrated gas component system that stacks at least two gas components into a single multifunctional unit. In a modular format, the multifunctional gas components stack in a direction perpendicular to the original gas flow axis. Thus, the components are stacked one on top of another, as many as can fit within the vertical height restraints, or as many as are necessary for the particular gas path application. The gas components can be individually manufactured components that are connected together using standard VCR connections or SEMI 2787 specification connections. Each connector could provide a connection that allows a vertical stack, or alternatively, could allow an in-line layout. In an alternative embodiment, the integrated, multifunctional gas component of the present invention can be a completely sealed, integral unit that performs several functions.

A specific embodiment of the present invention is a multifunctional filter/pressure transducer module that stacks the pressure transducer on top of the filter. Thus, unlike the conventional gas component arrangements currently used where the filter would be connected in-line (typically horizontally) to the pressure transducer along the axis of the gas flow in the gas path, the filter/pressure transducer module of the present invention would stack the pressure transducer vertically on the filter in a direction perpendicular to the original gas flow path.

In another specific embodiment, a filter could be fitted in-line within a mass flow controller along the axis of the gas flow (again, typically horizontally). As noted earlier, either of these embodiments could be separate gas components that are connected together (e.g., the filter connected using VCR connections to the mass flow controller), or alternatively, as an integral unit by a welded or other permanently sealed connection.

The present invention provides an important technical advantage by integrating two or more gas components into a single unit that allows the gas stick to occupy less space, even when incorporating more components.

The present invention provides another technical advantage by allowing more gas components to be placed on a modular gas stick footprint.

The present invention provides yet another technical advantage by providing a method of stacking components on a modular gas stick footprint.

The present invention provides another technical advantage by combining several functions into a single gas component.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 4 shows another specific embodiment of the present invention combining the functionality of a filter and a valve in a vertically stacked, modular, surface mount format using removable connections;

FIGS. 5A–5C show three specific embodiments of the integral, surface mount, single unit, multifunctional gas components of the present invention connected using a permanent connection; and FIG. 6 shows an in-line multifunctional embodiment of the present invention combining the functionality of a filter and a mass flow controller, with both a removable (modular) and a permanent (integral) connection methodology.

DETAILED DESCRIPTION OF THE INVENTION

Preferred embodiments of the present invention are illustrated in the Figures, like numerals being used to refer to like and corresponding parts of the various drawings.

The system and method for integrating gas components of the present invention combines together, either in an in-line or modular fashion, at least two gas components used in a gas stick for flowing a gas from a first point to an end point. For example, the present invention can be used to combine a pressure transducer, a filter, and a display into a single unit that will reduce the gas stick size along the gas flow axis of the gas stick. The gas components can be integrated using VCR connections for an in-line use of the present invention. In the modular form, the present invention can use a number of different connections to connect the gas components vertically on a base block (i.e., stacked approximately perpendicular to the base block). Thus, the gas components will stack vertically with respect to the traditional horizontal gas flow path axis.

The connections used to integrate the gas components can include industry standard connections (such as VCR connections, Buttweld connections, and Swagelock connections); and also connections using connectors that meet the draft SEMI 2787 specification, described in SEMI Draft Doc. 2787, incorporated herein by reference (such as B-seal, C-seal, CS-seal, W-seal and Z-seal connectors). Examples of the gas components that can be integrated according to the present invention include gas filters, gas purifiers, pressure transducers, mass flow controllers, displays, moisture monitors (ILMs), gauges, valves, diffusers, capacitance diaphragm gauges, and pressure regulators. The present invention includes the integration of at least two gas components into a single, multifunctional unit. It should be understood that while the multi-functional gas components of the present invention will be further illustrated and described using the specific application of a semiconductor gas stick, the system and method of integrating gas components can be applied to other gas flow paths.

Figure 2A:
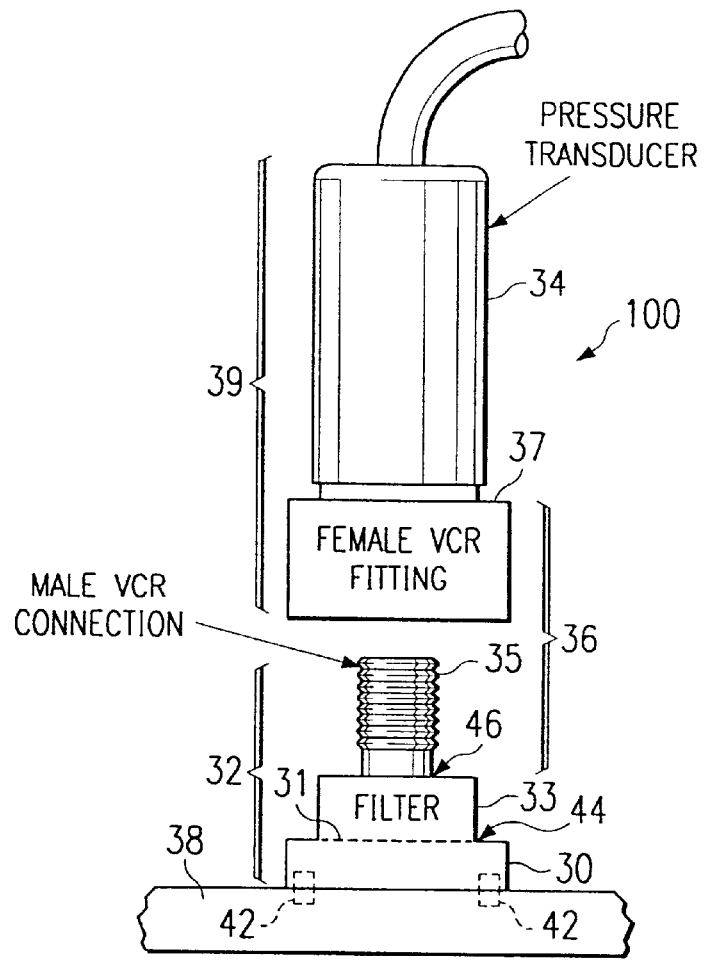
FIG. 2A show a modular, vertically stacked, surface mount embodiment of the present invention combining the functionality of a filter and a pressure transducer connected using removable connections.
Figure 2E:
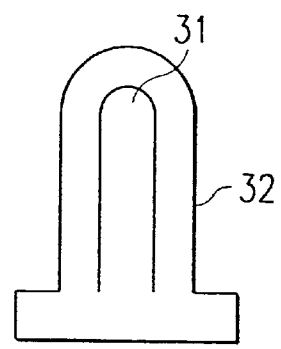
FIG. 2E shows a tube filter membrane with a filter section that can be used in the embodiment of FIG. 2A.

FIG. 2A shows one embodiment of the integrated gas component system 10 of the present invention that provides the multiple functions of a pressure transducer and a filter. The pressure transducer/filter integrated gas component unit 100 shown in FIG. 2A includes a filter section 32, a pressure transducer section 39, and a modular connection 36 that connects pressure transducer section 39 to filter section 32. Modular connection 36 is a VCR connection that includes a male VCR connection 35 and female VCR fitting 37. Filter section 32 includes a filter 33, a disk membrane 31, a C-seal 30, and male VCR connection 35. As shown, the C-seal 30 is welded to the filter 33 at weld 44, while male VCR connection 35 is welded to filter 33 at weld 46. The disk membrane 31 shown in FIG. 2A provides a filtering function during normal operation. The disk membrane 31 takes the form of a disk (versus a filter section 32 which utilizes a tube membrane 31 as shown in FIG. 2E) that lays across the filter section 32 opening between the C-seal 30 and the filter 33. The disk membrane 31 can have, for example, a log reduction value of equal to or greater than four LRV. The disk membrane 31 can comprise teflon, stainless steel, nickel, and ceramic. The disk membrane 31 can be attached to the body of filter section 32 with a weld around the outer circumference of the disk membrane 31. The disk membrane 31 provides an advantage over the tube membrane 31 by reducing the height and size of the overall unit 100. This, in turn, helps provide a filter/pressure transducer unit 100 (as shown in FIG. 2A) that is compliant with SEMI specification 2787. Pressure transducer section 39 includes pressure transducer 34 and female VCR fitting 37. The pressure transducer section 39 is currently manufactured with VCR and other connections incorporated. Filter section 32 couples to pressure transducer section 39 by connecting the male VCR connection 35 to the female VCR fitting 37. The filter section 32 can coupled to a modular base 38 at C-seal connections 42.

Figure 2B:
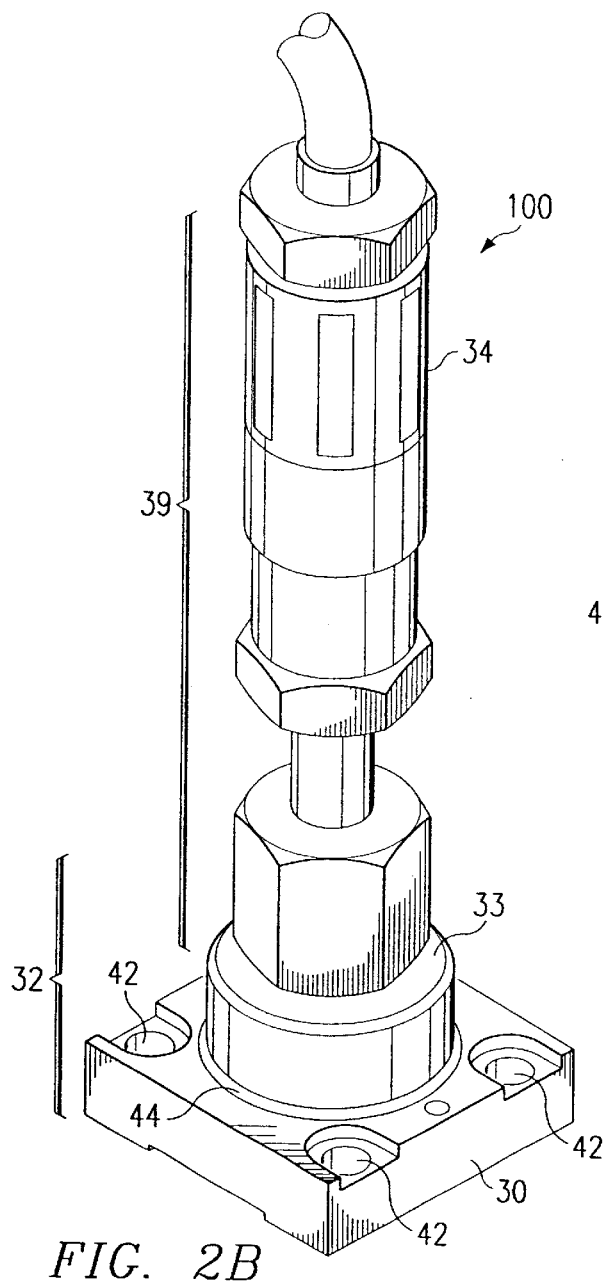
FIGS. 2B–2D show additional views of the embodiment of FIG. 2A.
Figure 2C:
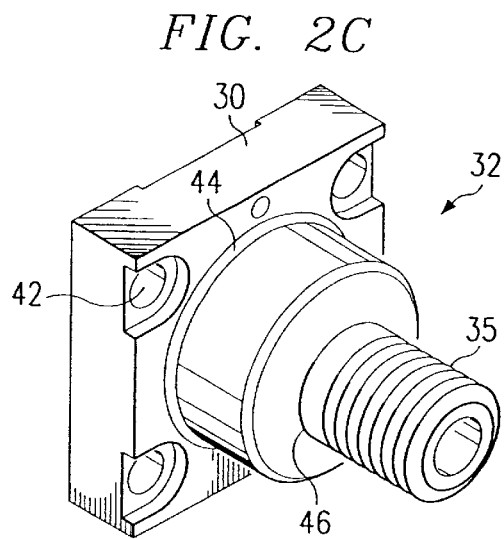
Figure 2D:
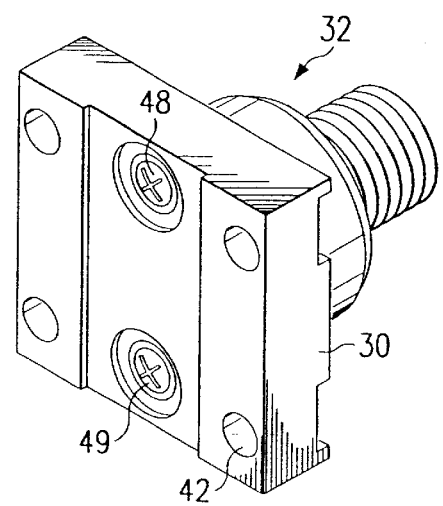

FIGS. 2B–2D show additional views of the filter/pressure transducer gas component 100 of FIG. 2A. In FIGS. 2B–2D, the SEMI 2787 seal 30 is a W-seal (rather than the C-seal of FIG. 2A), with the remaining features identical to FIG. 2A. FIGS. 2C and 2D also show in greater detail the filter section 32 of filter/pressure transducer unit 100. As shown in FIG. 2D, filter section 32 also includes input port 48 and output port 49. During operation, a gas will flow into filter/pressure transducer unit 100 through input port 48, through filter 33, into pressure transducer 34, through pressure transducer 34 and back to filter 33 and will finally exit filter/pressure transducer unit 100 through output port 49.

Filter 33 and pressure transducer 34 include standard filters and pressure transducers used in gas flow operations and systems which are known to those skilled in the art. Filter membrane 31 includes standard tube membranes and disk membranes which are known to those skilled in the art.

The embodiment shown in FIGS. 2A–2E provide a modular, vertically-stacked, surface mount gas component unit 100 that can be used on a modular base (such as in a SEMI 2787 conforming gas stick). This embodiment is a SEMI 2787-seal/VCR stack that uses a C-seal or W-seal connection to connect the filter section 32 to a modular base 38 (which may be used in a modular gas stick for example) and a VCR fitting to connect the filter section 32 to the pressure transducer section 39. The modular connections 36 and 38 allow replacement of either the filter 32 or the pressure transducer 34, or both, without having to replace the other functioning gas components. For example, if the filter 32 fails, it can be replaced by unscrewing pressure transducer 34 off of filter 32 at modular VCR connection 36 and removing filter 32 from modular base 38 at C-seal or W-seal connection 30. A replacement filter section 32 can then be inserted and the entire filter/pressure transducer gas component unit 100 replaced on modular block 38.

Figure 1:
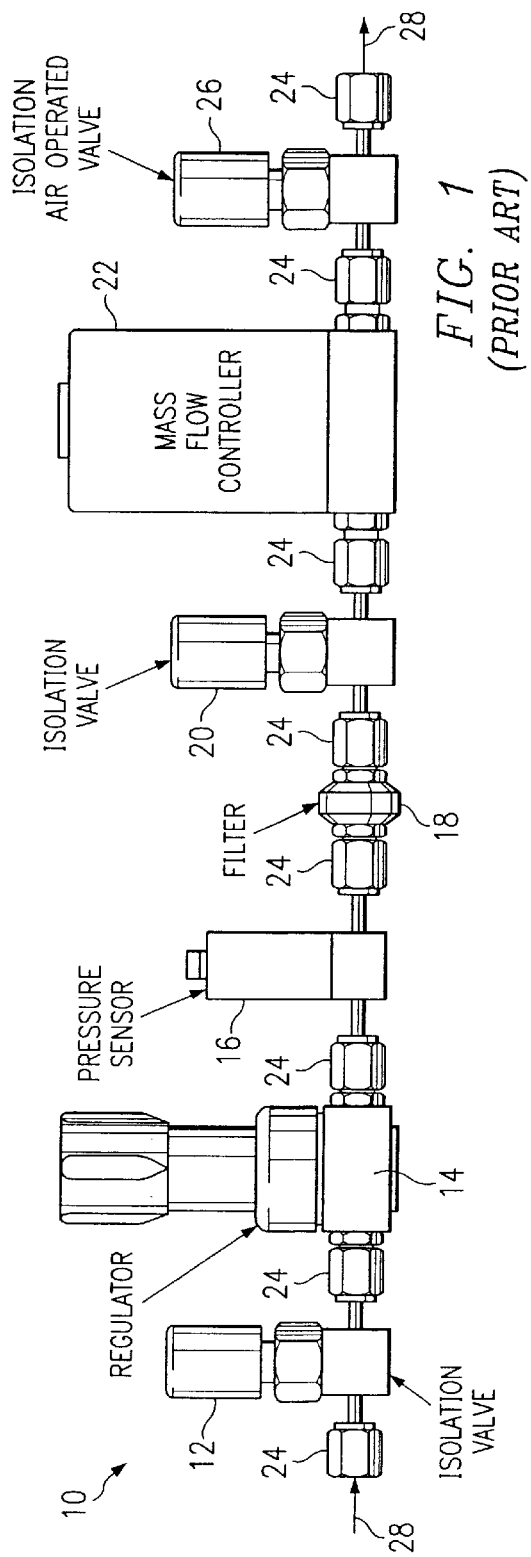
FIG. 1 shows a prior art gas flow path, a gas stick, having a series of individual, single function gas components connected together in-line along the axis of gas flow.
Figure 3:
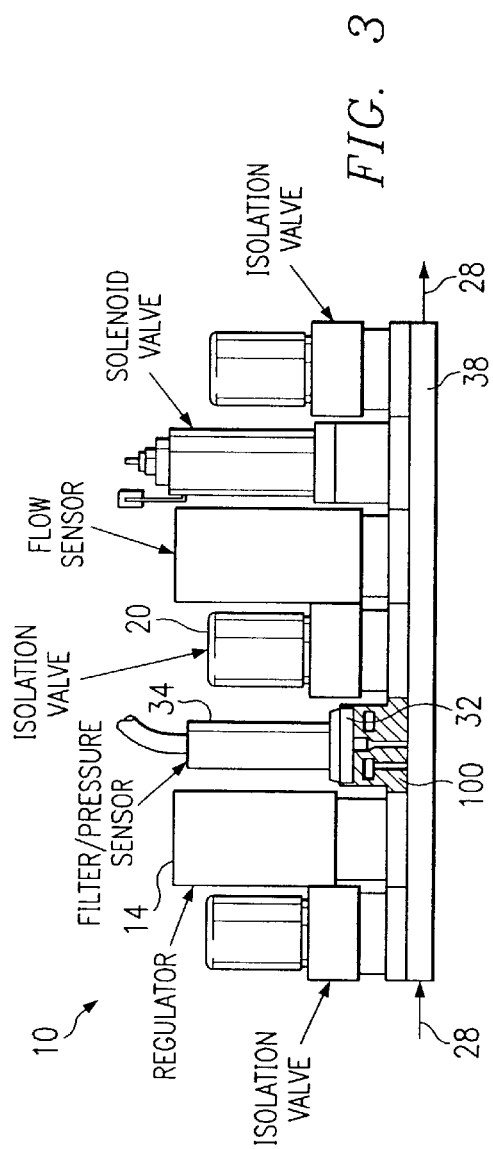
FIG. 3 shows a gas stick incorporating the FIG. 2A embodiment of the present invention.

FIG. 3 shows the embodiment of FIGS. 2A and 2B incorporated in a gas stick 10. The embodiment shown in FIG. 3 shows a modular gas stick 10 as opposed to the conventional in-line gas stick 10 of FIG. 1. The modular gas stick 10 fits onto a modular base 38 that meets SEMI 2787 specifications for modular gas sticks (including height, length, and width requirement). In FIG. 3, the modular, surface mount filter/pressure transducer 100 mounts after regulator 14 and before isolation valve 20. This is different from the in-line gas stick 10 shown in FIG. 1. In FIG. 1, the in-line gas stick 10 was configured such that the gas components required a connector 24, pressure sensor 16, connector 24, filter 18, and connector 24 between the regulator 14 and isolation valve 20. The present invention reduces these gas components to a single, multifunctional filter/pressure transducer unit 100 as shown. This results in a reduction in horizontal space along the axis of gas flow 28. As can be seen in FIG. 3, the filter section 32 stacks vertically on modular base 38 (i.e., approximately perpendicular to the axis of gas flow 28), and the pressure transducer section 39 stacks vertically on top of the filter section 32.

FIG. 4 shows another way of modularly integrating multiple gas components. Instead of modularly integrating multiple gas components using a combination of male and female VCR connectors and/or C-seals, the embodiment shown in FIG. 4 utilizes two C-seals 30 to integrate a valve 70 to filter 33 and another C-seal 30 to integrate the filter 33 to a modular base 38. The double C-seal connection of FIG. 4 replaces the male/female VCR connection of FIGS. 2A and 2B. It should be noted that other SEMI 2787 modular seals such as a B-seal, CS-seal, W-seal, and Z-seal may also be used in place of the C-seal 30 shown in FIG. 4.

FIGS. 5A, 5B, and 5C depict another embodiment of the multifunctional gas component unit 100 that is a sealed unit having multiple gas components in a single, integral, and contained unit. The embodiments shown in FIGS. 5A, 5B, and SC are all shown as surface mount configurations. FIG. 5A shows a valve 70 mounted on top of a filter 33 integrated as a single multifunctional gas component unit 100 mounted on top of a modular base 38. FIG. 5B shows a monitor display 51 on top of a transducer 34, on top of a filter 33 all integrated as a single multifunctional gas component unit 100 and mounted on top of a modular base 38. FIG. 5C shows a regulator 14, on top of a filter 33 integrated as a single multifunctional gas component unit 100 mounted on top of a modular base 38. Each of the FIGS. 5A–5C embodiments include welds 80 to connect the individual gas components together into a single unit. It should be understood that the system and method for integrating gas components of the present invention can stack multiple gas components, one upon another, using the same methods described in FIGS. 2A, 2B, and 4. A multifunctional gas component unit 100 comprised of three gas components can be seen in FIG. 5B.

FIG. 6 shows an embodiment of the system and method for integrating gas components of the present invention where multiple gas components can be integrated at a modular base in an in-line fashion. FIG. 6 shows a mass flow controller 22 mounted on a modular base 38 and a tubular filter 31 is mounted to a side of the modular base forming multifunctional gas component unit 100. The multifunctional gas component unit 100 could be connected to another gas component within a modular base 38 at tubular filter 31 in an in-line fashion rather than a stacked surface mount configuration as shown in FIGS. 2A, 2B, 4, 5A, 5B, and 5C. The tubular filter 31 is used as a gas flow restricter. A disk filter 31 could also be used in place of the tubular filter 31 in this embodiment.

The multifunctional gas component unit 100 shown in FIG. 2A that incorporates both C-seal and VCR connections provides the advantage because the industry standard VCR connection is significantly less expensive than the SEMI 2787 C-seal connections. In FIG. 2A, a C-seal 30 is used to allow the filter/pressure transducer unit 100 to be attached to a modular footprint 38 (to conform to SEMI 2787), but the connection between the pressure transducer 34 and the filter 33 is a VCR connection 36 (which is cheaper than using another C-seal 30 between the filter 33 and pressure transducer 34). However, it should be understood that SEMI 2787 to SEMI 2787 seals could be used, such as C-seal 30 to C-seal 30 connections, as shown in FIG. 4.

In summary, the system and method for integrating gas components of the present invention combines together, either in an in-line or modular fashion, at least two gas components used in a gas stick for flowing a gas from a first point to an end point. For example, the present invention can be used to combine a pressure transducer, a filter, and a display into a single unit that will reduce the gas stick size along the gas flow axis of the gas stick (as shown in FIG. 5B). The gas components can be integrated using VCR connections for an in-line use of the present invention. In the modular form, the present invention can use a number of different connections to connect the gas components vertically on a base block (i.e., stacked approximately perpendicular to the base block). Thus, the gas components will stack vertically with respect to the traditional horizontal gas flow path axis.

Although the present invention has been described in detail, it should be understood that various changes, substitutions and alterations can be made hereto without departing from the spirit and scope of the invention as described by the appended claims.

What is claimed is:

1. A method for manufacturing a modular gas stick, comprising the steps of:

coupling a first gas component to a modular base, wherein said first component comprises a gas filter; and vertically stacking a second component on top of said first gas component and coupling said first gas component to said second gas component using a first connector, wherein said second component comprises a pressure transducer;

integrating said pressure transducer and said gas filter to form a modular, integrated pressure transducer/filter integrated unit comprising:
a filter section;
a pressure transducer section; and
a modular connection operable to connect said pressure transducer section to said filter section.

2. The method of claim 1, wherein said modular connection is a VCR connector, said VCR connector comprising a male VCR connection and a female VCR fitting.

3. The method of claim 2, wherein said filter section comprises a gas filtering section, a membrane, a C-seal, an input port, an output port, and said male VCR connection, said C-seal welded to said gas filter at a first weld and said male VCR connection welded to said gas filter at a second weld, further wherein said filter section can be coupled to a modular base using C-seal connectors.

* * * * *